(12) United States Patent
Hessling et al.

(10) Patent No.: US 7,925,667 B2
(45) Date of Patent: Apr. 12, 2011

(54) METHOD, DATA FORMAT, ENCODING DEVICE, DECODING DEVICE AND SYSTEM

(75) Inventors: Matthias Hessling, Hildesheim (DE); Bernd Hessing, Holle (DE); Cornelius Hahlweg, Hamburg (DE); Heinz Werner Pfeiffer, Hohenhameln (DE); Henry Brandes, Woelpinghausen (DE)

(73) Assignee: Robert Bosch GmbH, Stuttgart (DE)

( * ) Notice: Subject to any disclaimer, the term of this patent is extended or adjusted under 35 U.S.C. 154(b) by 427 days.

(21) Appl. No.: 10/031,499

(22) PCT Filed: May 15, 2001

(86) PCT No.: PCT/DE01/01831
§ 371 (c)(1),
(2), (4) Date: Jun. 14, 2002

(87) PCT Pub. No.: WO01/88479
PCT Pub. Date: Nov. 22, 2001

(65) Prior Publication Data
US 2002/0183923 A1    Dec. 5, 2002

(30) Foreign Application Priority Data
May 15, 2000 (DE) .................................. 100 23 309

(51) Int. Cl.
*G06F 7/00* (2006.01)
*G01C 21/26* (2006.01)
(52) U.S. Cl. ......... 707/790; 707/791; 707/795; 701/207
(58) Field of Classification Search ................... 707/100, 707/790, 791, 795; 701/208, 217, 207
See application file for complete search history.

(56) References Cited

U.S. PATENT DOCUMENTS

| | | | | |
|---|---|---|---|---|
| 5,115,433 A | * | 5/1992 | Baran et al. | 370/400 |
| 5,400,338 A | * | 3/1995 | Flammer, III | 370/255 |
| 5,432,542 A | * | 7/1995 | Thibadeau et al. | 725/35 |
| 5,488,608 A | * | 1/1996 | Flammer, III | 370/400 |
| 5,543,789 A | | 8/1996 | Behr et al. | |
| 5,848,373 A | * | 12/1998 | DeLorme et al. | 701/200 |
| 5,931,888 A | * | 8/1999 | Hiyokawa | 701/208 |
| 6,044,323 A | * | 3/2000 | Yee et al. | 701/120 |
| 6,069,515 A | * | 5/2000 | Singh | 327/309 |
| 6,169,515 B1 | * | 1/2001 | Mannings et al. | 342/357.1 |
| 6,185,427 B1 | * | 2/2001 | Krasner et al. | 455/456.2 |
| 6,202,023 B1 | * | 3/2001 | Hancock et al. | 701/201 |
| 6,205,396 B1 | * | 3/2001 | Teicher et al. | 701/200 |
| 6,208,859 B1 | * | 3/2001 | Halvorson | 455/430 |
| 6,240,369 B1 | * | 5/2001 | Foust | 702/3 |
| 6,272,548 B1 | * | 8/2001 | Cotter et al. | 709/239 |
| 6,438,561 B1 | * | 8/2002 | Israni et al. | 707/104.1 |
| 6,571,173 B1 | * | 5/2003 | Joshi | 701/207 |
| 6,680,919 B1 | * | 1/2004 | Rauhala | 370/310 |
| 7,047,114 B1 | * | 5/2006 | Rogers | 701/21 |

FOREIGN PATENT DOCUMENTS

DE    197 03 610    8/1997

* cited by examiner

*Primary Examiner* — Etienne P LeRoux
*Assistant Examiner* — Cindy Nguyen
(74) *Attorney, Agent, or Firm* — Kenyon & Kenyon LLP

(57) ABSTRACT

A method, a data format, an encoding device, a decoding device and a system for encoding, for decoding and/or for transmitting location information, the location information including both locating information and description information, a data packet separately containing locating information and description information, and the data packet containing assignment information for assigning at least a part of the locating information to at least a part of the description information.

19 Claims, 2 Drawing Sheets

METHOD, DATA FORMAT, ENCODING DEVICE, DECODING DEVICE AND SYSTEM

FIELD OF THE INVENTION

The present invention relates to a method, a data format, an encoding device, a decoding device and a system for encoding, for decoding and/or for transmitting location information.

BACKGROUND INFORMATION

It is believed that there are a number of formats for digital maps, in particular proprietary or standardized ones. An example of a standardized map is the GDF format. Moreover, it is believed that proposals have been made for the most different georeferencing methods.

SUMMARY OF THE INVENTION

It is believed that an exemplary method, data format, encoding device, decoding device and system according to the present invention have an advantage that may permit geographical objects of arbitrary complexity to be efficiently encoded, interpreted and transmitted. In this regard, geometry-oriented data and description-oriented attributes may be clearly distinguished. Moreover, it is believed that this may advantageously allow map segments to be encoded, decoded and/or transmitted, the map segments being geometrically open or closed, for example, in the form of meshes. Thus, geometric representations may be read in a single sequence, that is, "in one piece". Furthermore, this may result in a division of referencings and applications being attainable, i.e., the location information encoded, according to an exemplary embodiment of the present invention, may be optionally evaluated, mainly by its geometry-oriented information (i.e., in particular by its coordinate chains), the attribute-oriented description information playing a minor role or, alternatively, primarily in an application-oriented manner, i.e., with respect to its attribute information.

Moreover, it is believed that an exemplary embodiment of the present invention has an advantage involving locating information that includes at least one first coordinate chain, the coordinate chain including at least one first, in particular, geographical point. In this regard, locating information may be encoded, decoded and/or transmitted with a small encoding outlay and with high accuracy.

It is believed that an exemplary embodiment of the present invention has an advantage involving the first coordinate chain containing a second point, the first point of the first coordinate chain being specified in absolute coordinates and the second point of the first coordinate chain being specified in relative coordinates, in particular with respect to a centroid coordinate or with respect to the first point of the first coordinate chain. In this regard, location information may be encoded, decoded and/or transmitted in the form of a serial representation along the coordinate chains. In this manner, moreover, an efficient encoding of the locating information may be attained, which may result in a smaller outlay, such as, for example, less memory requirements for the encoding and/or smaller bandwidth requirements for the transmission and decoding.

It is believed that an exemplary embodiment of the present invention has an advantage involving the first point of the first coordinate chain being interpreted in a defined direction, by the second point of the first coordinate chain. Thus, directional information may result from the serial arrangement of the plurality of points of a coordinate chain.

It is believed that an exemplary embodiment of the present invention has an advantage involving the first point of the first coordinate chain being interpreted in a defined direction by the second point of the first coordinate chain. Due to the sequence of points defining a coordinate chain, defined directional information is given that ensues from the structure of the coordinate chain and may be evaluated.

It is believed that an exemplary embodiment of the present invention has an advantage involving the description information including at least one first attribute field. In this manner, the most different kinds of other information may be encoded, decoded and transmitted, in addition to the pure locating information in the form of coordinate chains.

It is believed that an exemplary embodiment of the present invention has an advantage involving the first attribute field including a type specification and description data, the description data being determined by the type specification, in particular with respect to the name, accuracy, direction, time, a POI (point of interest) and/or a physical link. In this manner, for example, accuracy information may be specified in a variable manner over a coordinate chain. Also, in this manner, a link between different coordinate chains may be established by providing a description type "physical link".

In this regard, for example, entire networks of location information may be encoded, decoded and/or transmitted by the inventive method, data format, encoding device, decoding device and system. In this regard, such a physical link between coordinate chains may correspond, for example, to a branch.

It is believed that an exemplary embodiment of the present invention has an advantage involving the assignment information including at least one first assignment entry, the first attribute field and the first point of the first coordinate chain being assigned to each other by the first assignment entry. Thus, the assignment information may be provided symmetrically, i.e., due to the assignment information, the location information may be searched both for coordinates or coordinate chains and for attribute fields contained in description information. Thus, the method and the data format according to an exemplary embodiment of the present invention may be suitable both for geometry-oriented georeferencing methods and for attribute-oriented georeferencing methods.

It is believed that an exemplary embodiment of the present invention has an advantage involving the first assignment entry including both a reference to the first attribute field and a reference to the first point of the first coordinate chain. Thus, exactly one link may be established between a point of a coordinate chain (i.e., a so-called "chain link") and an attribute field, i.e., description data or a type specification by an entry in the assignment information (reference table). By adding a further entry to the list of assignment information, i.e., to the reference table, a further link may be established between a point of a coordinate chain and an attribute field, however, at least one reference may be required to be different from all other entries in the list of assignment information, i.e., either a different point from the set of locating information may be referenced in the case of the further entry in the list of assignment information or a different attribute field of the description information may be referenced.

It is believed that an exemplary embodiment of the present invention has an advantage involving the first assignment entry including either both a reference to the first attribute field and a reference to a plurality of points of coordinate chains of the locating information, or both a reference to a plurality of attribute fields and a reference to the first point of the first coordinate chain. Thus, the assignment information may be simplified, thereby attaining a more compact encoding of the location information, by executing an appropriate grouping of entries in a list of the assignment information. For example, entries having the same attribute reference or entries having a successive set of points within a single coordinate chain may be combined.

It is believed that an exemplary embodiment of the present invention has an advantage involving the data packet including a header part of the location information and data part of the location information. This may permit a separation between pure pattern information of the whole data block and information that is to be encoded, decoded and/or transmitted.

It is believed that an exemplary embodiment of the present invention has an advantage involving the header part including structure information and interpreting instructions, the structure information specifying the data structure of the location information, and the interpreting instructions specifying the purpose of the location information. This may permit, in particular during the decoding of the location information, faster and more efficient processing, by sorting out location information that is irrelevant for a specific purpose of processing.

It is believed that an exemplary embodiment of the present invention has an advantage involving the definition of at least the first point of the first coordinate chain being definable as a function of a location information query. Thus, the location information may be individually and flexibly geared to the location information query.

It is believed that an exemplary embodiment of the present invention has an advantage involving the location information being at least partially correlatable with data of a first data base that is assigned to the decoding device. This may result in an increase in the encoding efficiency of the location information because at least a part of the required location information already exists in the first data base.

It is believed that an exemplary embodiment of the present invention has an advantage involving the location information that is not contained in the first data base and/or for which no correlation with data of the first data base is possible being stored in a second data base assigned to the decoding device. Thus, the inventory of data in the first and/or the second data base may be assigned to the decoding device to be extended, updated and/or completed, which may increase the overall effectiveness of an exemplary method and exemplary system, since identical queries at successive points in time, as a result of which identical location information would be transmitted, may be avoided.

DETAILED DESCRIPTION

Figure 1:
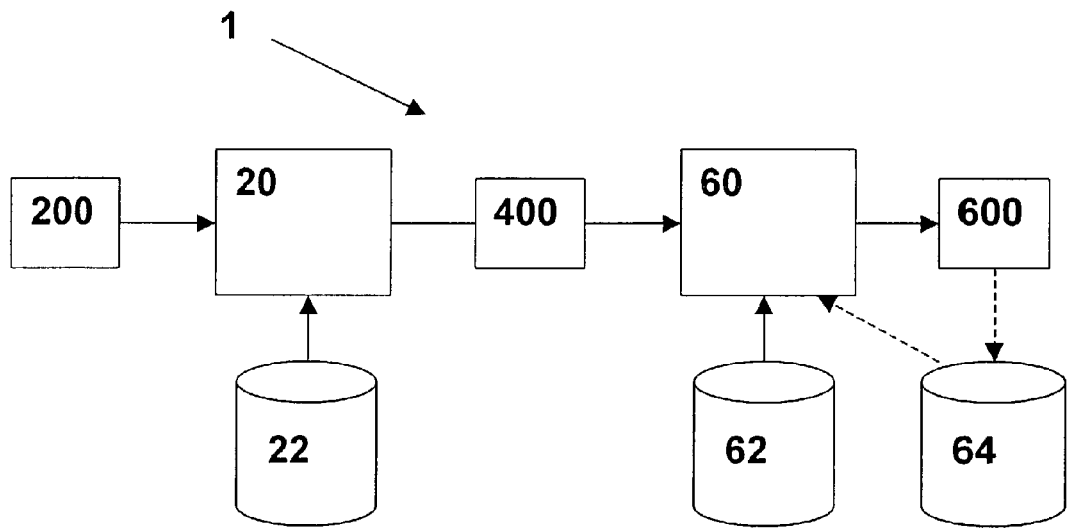
FIG. 1 shows an exemplary system according to the present invention including an encoding device and a decoding device for encoding, for decoding and/or for transmitting location information.

FIG. 1 shows a system 1 according to an exemplary embodiment of the present invention for encoding, decoding and/or transmitting location information. System 1 includes an encoding device 20 and a decoding device 60. Encoding device 20 transmits at least one data packet 400 to decoding device 60, by a transmission path. Associated with decoding device 60 is a first data base 62, decoding device 60 receiving data stored in first data base 62 when it decodes data packet 400. Decoding device 60 delivers a decoding result 600, as a result of the decoding of data packet 400. In an exemplary embodiment of the present invention, decoding result 600 may be entirely or partially stored in a second data base 64 that is associated with decoding device 60. In another exemplary embodiment of the present invention, the data stored in second data base 64 may be utilized, together with the data stored in first data base 62, for decoding data packet 400 in decoding device 60. The optional second data base 64 and the optional data stored in second data base 64 for decoding data packet 400 are represented in FIG. 1 by broken arrows pointing from decoding result 600 to second data base 64 and from second data base 64 to decoding device 60, respectively.

In this regard, the transmission path may be an arbitrary transmission path. According to an exemplary embodiment of the present invention, the transmission path may be, for example, a wire-bound or wireless transmission. A wireless transmission of data packet 400 may be implemented, for example, by a radio link. In this regard, a radio link according to a standard for wireless data transmission may be used, such as, for example, DECT, GSM, UMTS, GPRS or infrared. For the wireless transmission of data packet 400, transmission by an IP network may be implemented, for example, transmission over the Internet.

According to an exemplary embodiment of the present invention, first data base 62 may be provided, for example, as a read-only memory, such as a CD-ROM, magnetic tape or magneto-optical disk, second data base 64 being provided as a rewritable memory. In another exemplary embodiment of the present invention, first and second data base 62, 64 are physically combined in a single memory, such as, for example, a write-read memory throughout or a read-only memory in a first part, corresponding to a use as first data base 62, and a write-read memory in a second part, corresponding to a use as second data base 64.

In system 1, a third data base 22 is associated with encoding device 20. Third data base 22 may be either a read-only memory or a write-read memory, depending on the use of third data base 22. For example, if only statistical information is required from third data base 22 for encoding data packet 400 in encoding device 20, data base 22 may be a read-only memory, for example, an optical or magneto-optical disk, in particular for reasons of cost.

Alternatively, third data base 22 may be provided either entirely or partially as a write-read memory, so that current data may be written into the third data base, such as, for example, at regular intervals, the current data, together with the "old data inventory", being allowed for in the encoding of data packet 400 in encoding device 20.

The cause for the encoding of data packet 400 by encoding device 20 is given, according to an exemplary embodiment of the present invention, in particular in that a location information query 200 is fed to encoding device 20. However, encoding device 20 may encode data packet 400, for example, at regular intervals, and communicate it to decoding device 60.

In each case, the information content of data packet 400 may be different in the regular sequence of transmission operations.

Figure 2:
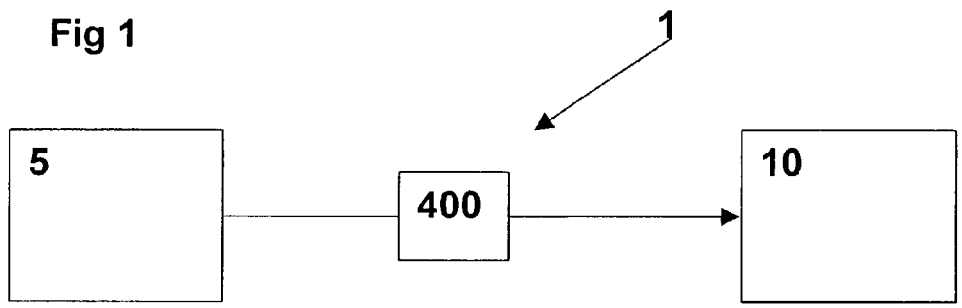
FIG. 2 shows an exemplary system according to the present invention including a transmitter and a receiver of location information.

FIG. 2 shows a system 1 according to an exemplary embodiment of the present invention, including a transmitter 5 and a receiver 10 of location information. Transmitter 5 transmits data packet 400 to receiver 10. For this purpose, an encoding device 20 may either be provided in transmitter 5, possibly with a third data base 22 associated therewith, or be assigned to transmitter 5. Accordingly, a decoding device 60 is either integrated in or assigned to receiver 10. In these two cases, decoding device 60 may optionally include first data base 62 and/or second data base 64.

Transmitter 5 may represent, for example, a service provider who transmits data packet 400 to users of a corresponding service by a broadcast transmission. In this case, receiver 10 represents a user of the service made available by the service provider. Services may include, for example, navigation and/or traffic information services. According to an exemplary embodiment of the present invention, location information receiver 10, which may represent a user of a service that either requires or provides the transmission of location information, may be a land vehicle or watercraft, or a user who needs location information.

Figure 3:
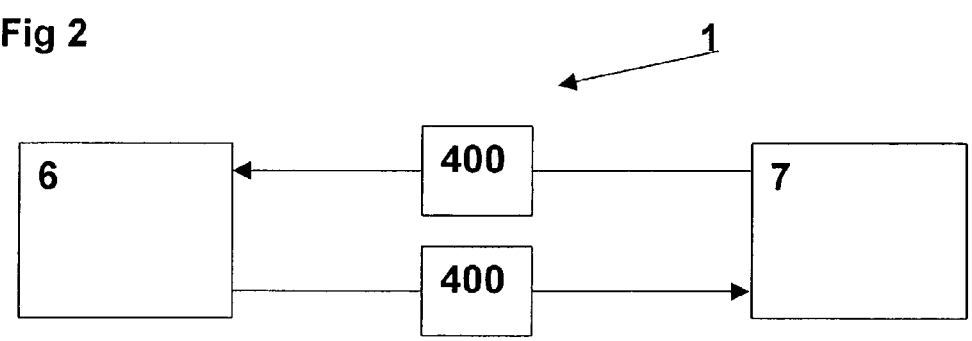
FIG. 3 shows an exemplary system according to the present invention including two transmitter-receivers of location information.

FIG. 3 shows system 1 according to an exemplary embodiment of the present invention, including a first transmitter-receiver 6 and a second transmitter-receiver 7. The first transmitter-receiver transmits information in the form of data packet 400 to second transmitter-receiver 7 and the second transmitter-receiver 7 transmits information in the form of data packet 400 to first transmitter-receiver 6. The information content of the respective data packets 400 may be different, depending on whether data packet 400 is transmitted from the first transmitter-receiver to the second transmitter-receiver or vice versa.

In an exemplary embodiment according to the present invention, second transmitter-receiver 7 is a motor vehicle that needs specific navigation or traffic telematics services, so that location information, for example, the most favorable traffic route in a given traffic jam or traffic flow situation in the affected road network, may be required by second transmitter-receiver 7. For this purpose, second transmitter-receiver 7 transmits data in the form of data packet 400 to first transmitter-receiver 6, which may be, for example, a service provider for navigation or traffic telematics services. Data packet 400 received by first transmitter-receiver 6 may contain, for example, location information on the starting and destination positions of second transmitter-receiver 7. Subsequently, data is encoded, which is transmitted from first transmitter-receiver 6 to second transmitter-receiver 7 as data packet 400, this data packet 400 containing the routing that is most favorable at the time of encoding.

According to another exemplary embodiment of the present invention, a user, by a navigation system, places a query with a service provider, regarding the nearest parking garage, since the data base that is available to the user, for example, in the navigation system, may not provide information on parking garages. For this purpose, the user's own position is transmitted to the service provider. This position may be ascertained from the data base of the navigation system on the user side, but may also be determined, for example, via GPS (global positioning system). The service provider transmits data packet 400 to the user, the data packet including information content that enables the navigation system on the user side to find the parking garage. Information may be sent to the service provider concerning which navigation system and data base (in particular, which update status) are present on the user side. Alternatively, if such information may not be communicated to the service provider, during the encoding of data packet 400, useful assumptions may be made concerning the data content of the data base or the navigation system of the user.

According to FIG. 3, first transmitter-receiver 6 and second transmitter-receiver 7 each contain an encoding device 20 and a decoding device 60, possibly with data bases 22, 62, 64 assigned for this purpose. In this regard, encoding device 20 of second transmitter-receiver 7 initially encodes data packet 400 that is transmitted from second transmitter-receiver 7 to first second transmitter-receiver 6. This data packet 400 is decoded in first transmitter-receiver 6 in decoding device 60 thereof, and is translated into location information query 200 that is thereupon made available to encoding device 20 of first transmitter-receiver 6. Data packet 400 to be transmitted from first transmitter-receiver 6 to second transmitter-receiver 7 is then encoded by encoding device 20 of first transmitter-receiver 6 and, after being transmitted to second transmitter-receiver 7, is decoded by decoding device 60 thereof, whereupon decoding device 60 of second transmitter-receiver 7 holds decoding result 600 for further use, for example, for display or storage.

Figure 4:
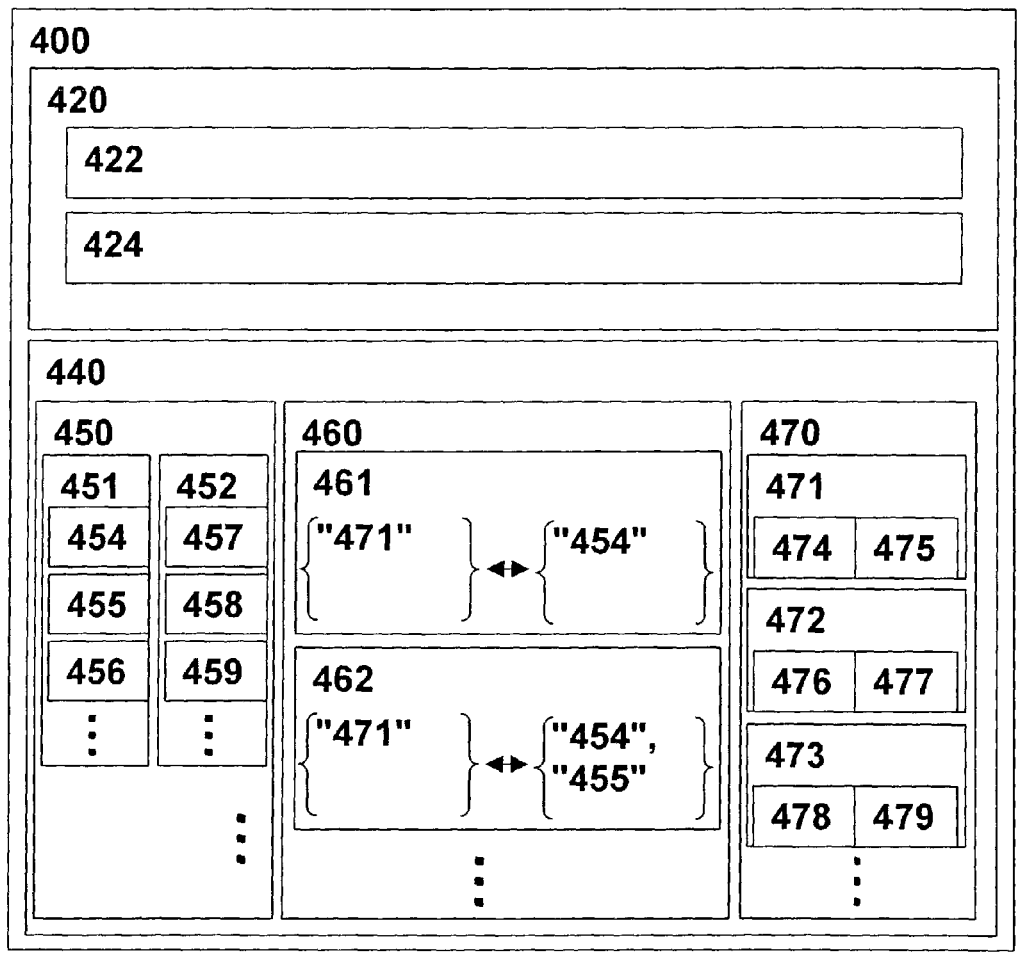
FIG. 4 shows a data packet based on an exemplary data format according to the present invention for encoding, decoding and transmitting location information.

FIG. 4 shows an exemplary structure of data packets 400. An exemplary data format according the present invention for coding, decoding and transmitting location information uses data packets 400 for the transmission of the location information. Data packet 400 is divided into a header part 420 and a data part 440. Header part 420 includes, on its part structure, information 422 and may also include interpreting instructions 424. Header part 420 is also denoted as header 420. The data structure of data packet 400 is specified in header 420 by structure information 422. The structural interpretation may be ensured in this manner.

Interpretation instructions 424 may allow the data content of data packet 400 to be correctly interpreted. For this purpose, a statement on the purpose of the data content may be furnished. Information on whether the information content of data packet 400 is, for example, a subnetwork of a digital map, a POI (point of interest) or a traffic jam warning may be furnished. The purpose of the data content of data packet 400 may be indicated, for example, by a type catalog, so that different possible data contents may unequivocally be recognized.

Data part 440 of data packet 400 is divided into locating information 450, description information 470, and assignment information 460. In this regard, locating information 450 and description information 470 are present or transmitted within data packet 400 separately from each other, such as, for example, during the transmission of data packet 400. For example, locating information 450 may be transmitted first, followed by description information 470 and then assignment information 460. Or, these three information types may be transmitted in a different order, but not such that they are mixed among themselves.

Locating information 450 includes an arbitrary number of coordinate chains, which are represented in FIG. 4 as a first coordinate chain 451 and a second coordinate chain 452. Specifically, locating information 450 does not include any coordinate chains 451, 452 and, consequently, data part 440 of respective data packet 400 does not include any locating information 450. Coordinate chains 451, 452 include an arbitrary number of points: a first point 454 of first coordinate chain 451; a second point 455 of first coordinate chain 451; and a third point 456 of first coordinate chain 451, which is representative of the arbitrary number of points of first coordinate chain 451. Correspondingly, a first point 457 of second coordinate chain 452, a second point 458 of second coordinate chain 452 and a third point 459 of second coordinate chain 452 represent the arbitrary number of points of second coordinate chain 452. In particular, a coordinate chain includes only one point.

In an exemplary embodiment according to the present invention, directional information is given by the sequence of the points in coordinate chains 451, 452. The points of a coordinate chain generally denote a geographical point, this point generally being defined by coordinate data with respect to a coordinate network, for example, on the surface of the earth. In this regard, the encoding efficiency may be increased, for example, by first point 454 being specified in absolute coordinates for first coordinate chain 451 and following points 455, 456 being specified only with relative coordinates with respect to first point 454. Alternatively, a point of a coordinate chain may be specified by the difference coordinate to its preceding point, i.e., to specify the differential vector between the preceding point and the point to be defined. Moreover, a centroid coordinate for a coordinate chain may be generated, the centroid coordinate being specified in absolute coordinates, and the points relative to the centroid coordinate may be defined.

Description information 470 includes an arbitrary number of attribute fields, which are represented in FIG. 4 as a first attribute field 471, a second attribute field 472, and a third attribute field 473. Description information 470 may not include any attribute fields, so that data part 440 of respective data packet 400 does not include any description information 470. First attribute field 471 includes a type specification 474 of first attribute field 471 and description data 475 of first attribute field 471. Second attribute field 472 likewise includes a type specification 476 of the second attribute field and description data 474 of second attribute field 472. Similarly, third attribute field 473 includes a type specification 478 of the third attribute field and description data 479 of the third attribute field. Type specifications 374, 476, 478 specify the type of information that is contained in the respective attribute fields 471, 472, 473. According to an exemplary embodiment of the present invention, this information may be a name, a directional accuracy, a time, a POI (point of interest) and/or a physical link. The description data 475, 477, 479 is then the information that corresponds to the respective type specification.

In an exemplary embodiment of the present invention, description data 475, 477, 479 may contain the indication of a time in an appropriate data format, if corresponding type specification 474, 476, 478 contains the type of a time indication.

Further examples of description data 475, 477, 479 or type specification 474, 476, 478 include:

"is desired object": an interpretation aid was already given in header part 420. The object that is actually to be referenced (i.e., one or a plurality of geometrical point(s) 454 to 459) may be explicitly marked as such.

Objects are marked by their "possible use". Encoded for an object in description information 470 of data packet 400 is, for example, information indicating that the object may be utilized only for representation, but not for matching, that is, for the correlation with data of a data base.

Preferred points that are deemed to be important on the transmitter side should be markable as such.

Crossing points in a network of a digital map may be treated either as a physical link or as a further category of the type "crossing".

Assignment information 460 includes an arbitrary number of assignment entries, which are represented in FIG. 4 as a first assignment entry 461 and a second assignment entry 462. In particular, assignment information 460 may not include any assignment entries, so that data part 440 of the respective data packet does not include any assignment information 460. According to an exemplary embodiment of the present invention, assignment information 460 may be represented in the form of a table. In this regard, each assignment entry includes a reference both to a point 454 to 459 and to an attribute field 471, 472, 473. In this manner, a link may be established in the form of an assignment between a point 454 to 459 of a coordinate chain 451, 452 and the data of an attribute field 471, 472, 473. In this manner, it is provided, permitted both that by an assignment entry 461, 462 a link is established between exactly one point 454 to 459 and exactly one attribute field 471 to 473 and it is also permitted that an assignment between a number of several points 454 to 459 and exactly one attribute field 471 to 473 or else between exactly one point 454 to 459 and a number of several attribute fields 471 to 473 is established. As a result, the encoding efficiency may be increased. This may be given by the mentioned combination of assignment entries having the feature that the information content of their attribute field is identical or that they refer to successive points. By grouping such "single assignment entries" into a single "group assignment entry", a compression may be attained.

In an exemplary embodiment of the present invention, a reference to a point 454 to 459 of a coordinate chain 451, 452 may be made, by specifying the number of coordinate chain 451, 452 and the list position of point 454 to 459 within the chain. The reference to an attribute field is correspondingly given by its number or list position. By assignment entries 461, 462, assignment information 460 is a cross-referencing, which may be represented in tabular form.

According to an exemplary embodiment of the present invention, if both locating information 450 and assignment information 460, as well as description information 470, do not contain any entries, respectively, data part 440 of respective data packet 400 is empty. This fact may be encoded in header part 420 of data packet 400. In this regard, structure information 422 of header part 420 may contain, for example, data with respect to the length (for example, in bytes) of header part 420, data on the length (for example, in bytes) of interpreting instruction 422 of header part 420, data on the number of coordinate chains 451, 452 within locating information 450, and data on the number of points contained in each of the coordinate chains, data on the number of assignment entries 461, 462 within the assignment information 460 and data on the number and the respective length (for example, in bytes) of attribute fields 471 through 473 of description information 470. By this data structure in header part 420, with respect to data part 440 of data packet 400, individual information types of data part 440 may be separately accessed.

Figure 5:
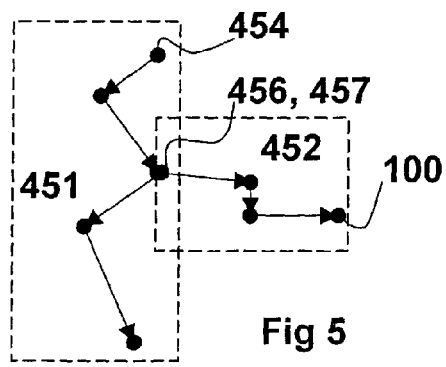
FIG. 5 shows the information content of a data packet.

FIG. 5 shows the information content of a data packet 400. First coordinate chain 451 includes a number of points, which are framed in FIG. 5 by a first frame of broken lines. Included among the points of first coordinate chain 451 is first point 454 of first coordinate chain 451, an arrow pointing from the first point to the second point (not marked) of first coordinate chain 451. From the second point of first coordinate chain 451, in turn, an arrow points to third point 456 of first coordinate chain 451, and from there to a fourth point (not marked) of coordinate chain 451, and so on. At third point 456 of first coordinate chain 451, second coordinate chain 452 branches off, the points thereof being framed in FIG. 5 by a second frame of broken lines. From first point 457 of second coordinate chain 452, in turn, an arrow points to the second point (not marked) of second coordinate chain 452, and from there further to the third point (not marked) of second coordinate chain 452. From the third point of second coordinate chain 452, an arrow points to a fourth point of second coordinate chain 452, the fourth point, in the exemplary embodiment, at the same time being the last point of second coordinate chain 452 and indicating, for example, a department store, a parking garage or, in more general terms, a POI (point of interest).

The exemplary embodiment of FIG. 5 shows third point 456 of first coordinate chain 451 and first point 457 of second coordinate chain 452 marking the same geographical point. Thus, a physical link may be established between these two points. The information on the physical link is stored in description information 470 of data packet 400 and is assigned to the two mentioned points 456, 457 by assignment information 460 of the data packet as described above. In this manner, entire networks, which correspond to digital maps, may be encoded, decoded and transmitted, using an exemplary data format according to the present invention.

The encoding of data packet 400 may be:
the provision of the actual object, i.e., of the object that is requested especially by location information query 200, with a corresponding environment of locating or description information by a suitable retrieval, that is, by a correlation with the data of the data base on third data base 22;
the transfer of the geometry representing this data into a suitable set of coordinate chains 451, 452 or, more generally, to a suitable set of location information 450;
the transfer of relevant identifiers from third data base 22 into format-compliant attribute fields 471, 472, 473;
the marking of relevant parts (such as, for example, "is desired object", POI);
the generation of assignment information 460, in particular in the form of a cross-reference table;
the generation of header 420 and data part 440.

In another exemplary embodiment of the present invention, the encoding may include only a part of these steps. It is believed that this may provide an advantage when data packets 400 have to be encoded, which are just standard ones or intended for a very specific purpose or application. This may occur when a user, for example, in a motor vehicle, interrogates traffic information with respect to a route to be traveled. It may be sufficient, during the encoding of data packet 400 that is to be transmitted from the user to a service provider, for example, by mobile telephony, for data packet 400 to transmit only the starting and destination coordinates along with the information indicating whether the coordinates are starting or destination coordinates.

The decoding of data packet 400 may be:
a comparison of the geometrical information contained in data packet 400 with the data content of first data base 62 and/or second data base 64 in connection with which, in particular, suitable correlation methods (matching) may be used, resulting in a set of references to first and second data base 62, 64 associated with decoding device 60.

According to an exemplary embodiment of the present invention:
a geometrical consistency check for geometrical objects, which are possibly to be newly connected, may be performed;
a retrieval on first and/or second data base 62, 64 along the lines of string comparisons may be performed, using the attributes existing, in particular, in description information 470 of the data packet, referenced to these data bases being expected as the result again;
a crosswise check of the consistency between geometry-oriented information and description-oriented information may be performed by assignment information 460 of data packet 400;
geometry-oriented and/or description-oriented information may be stored in second data base 64, in particular, objects to be newly connected together with the references.

What is claimed is:

1. A method for at least one of electronically encoding, decoding and transmitting location information of objects for a map, the method comprising:
at least one of electronically encoding using an encoding device, decoding using a decoding device and transmitting an electronic data packet using a transmitting device, the data packet containing location information of at least one object for a map, the location information of at least one object including locating information and description information, wherein the data packet separately contains the locating information and the description information, and includes assignment information assigning at least a part of the locating information to at least a part of the description information.

2. The method of claim 1, wherein the locating information includes at least one first coordinate chain including at least one first point.

3. The method of claim 2, wherein the at least one first coordinate chain contains a second point, the at least one first point of the at least one first coordinate chain is specified in absolute coordinates and the second point of the at least one first coordinate chain is specified in relative coordinates, with respect to one of a centroid coordinate and the at least one first point of the at least one first coordinate chain.

4. The method of claim 3, wherein the at least one first point of the at least one first coordinate chain is interpreted in a defined direction by the second point of the at least one first coordinate chain.

5. The method of claim 1, wherein the description information includes at least one first attribute field.

6. The method of claim 5, wherein the at least one first attribute field includes a type specification and description data, and the description data is determined by the type specification with respect to at least one of a name, an accuracy, a direction, a time, a point of interest and a physical link.

7. The method of claim 5, wherein the assignment information includes at least one first assignment entry, and the at least one first attribute field and the at least one first point of the at least one first coordinate chain are assigned to each other by the at least one first assignment entry.

8. The method of claim 7, wherein the at least one first assignment entry includes a reference to the at least one first attribute field and a reference to the at least one first point of the at least one first coordinate chain.

9. The method of claim 7, wherein the at least one first assignment entry includes one of (i) a reference to the at least one first attribute field and a reference to a plurality of points of coordinate chains of the locating information, and (ii) a reference to a plurality of attribute fields and a reference to the at least one first point of the at least one first coordinate chain.

10. The method of claim 1, wherein the data packet includes a header part of the location information and a data part of the location information.

11. The method of claim 10, wherein the header part includes structure information specifying a data structure of the location information, and includes interpreting instructions specifying a purpose of the location information.

12. A method of at least one of electronically encoding, decoding and transmitting location information of objects for a map, the method comprising:
at least one of an encoding device, a decoding device and a transmitting device, providing an electronic data packet including location information of at least one object for a map, wherein the location information of at least one object includes locating information and description information, wherein the data packet separately contains the locating information and the description information, and includes assignment information assigning at least a part of the locating information to at least a part of the description information.

13. An electronic encoding device for encoding location information of objects for a map, the encoding device comprising:
an arrangement to electronically encode a data packet including location information of at least one object for a map, the location information including locating information and description information, wherein the data packet separately contains the locating information and the description information, and includes assignment information assigning at least a part of the locating information to at least a part of the description information.

14. The encoding device of claim 13, wherein the locating information includes at least one first coordinate chain that includes at least one first point, and a definition of the at least one first point of the at least one first coordinate chain is definable as a function of a location information query.

15. An electronic decoding device for decoding location information of objects for a map, the decoding device comprising:
an arrangement to electronically decode an electronic data packet containing location information of at least one object for a map, the location information including locating information and description information, wherein the data packet separately contains the locating information and the description information, and includes assignment information assigning at least a part of the locating information to at least a part of the description information.

16. The decoding device of claim 15, wherein the location information is at least partially correlatable with data of a first data base associated with the decoding device.

17. The decoding device of claim 16, wherein at least one of location information that is not contained in the first data base and location information that is not correlated with data of the first data base is stored in a second data base associated with the decoding device.

18. An electronic system for transmitting location information, the system comprising:
an arrangement to electronically transmit an electronic data packet using a transmitting device, the data packet containing location information of at least one object for a map, the location information including locating information and description information, wherein the data packet separately contains the locating information and the description information and includes assignment information assigning at least a part of the locating information to at least a part of the description information.

19. The method of claim 2, wherein the at least one first point includes a geographical point.

* * * * *